United States Patent
Chatterji et al.

(10) Patent No.: US 10,975,285 B2
(45) Date of Patent: *Apr. 13, 2021

(54) CO-GRINDING SLAG WITH OTHER MATERIAL FOR HYDRAULIC BINDERS

(71) Applicant: Halliburton Energy Services, Inc., Houston, TX (US)

(72) Inventors: Jiten Chatterji, Duncan, OK (US); Darrell Chad Brenneis, Marlow, OK (US); James Robert Benkley, Duncan, OK (US); Gregory Robert Hundt, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,958

(22) Filed: May 15, 2020

(65) Prior Publication Data

US 2020/0277523 A1    Sep. 3, 2020

Related U.S. Application Data

(62) Division of application No. 16/072,133, filed as application No. PCT/US2016/025344 on Mar. 31, 2016, now Pat. No. 10,703,958.

(51) Int. Cl.
| | |
|---|---|
| *E21B 33/13* | (2006.01) |
| *C09K 8/467* | (2006.01) |
| *C04B 28/08* | (2006.01) |
| *C09K 8/46* | (2006.01) |
| *C04B 20/00* | (2006.01) |
| *C04B 103/00* | (2006.01) |

(52) U.S. Cl.
CPC ............ *C09K 8/467* (2013.01); *C04B 20/008* (2013.01); *C04B 28/08* (2013.01); *C09K 8/46* (2013.01); *E21B 33/13* (2013.01); *C04B 2103/0088* (2013.01); *C09K 2208/10* (2013.01)

(58) Field of Classification Search
CPC ...... C09K 8/467; C09K 8/46; C09K 2208/10; C04B 20/008; C04B 28/08; C04B 2103/0088

See application file for complete search history.

(56) References Cited

U.S. PATENT DOCUMENTS

| | | |
|---|---|---|
| 5,106,423 A | 4/1992 | Clarke |
| 5,482,549 A | 1/1996 | Blaakmeer et al. |
| 8,486,869 B2 | 7/2013 | Brenneis et al. |
| 8,505,630 B2 | 8/2013 | Chatterji et al. |

(Continued)

FOREIGN PATENT DOCUMENTS

| | | |
|---|---|---|
| CN | 103539367 | 1/2014 |
| KR | 100906234 | 7/2007 |

OTHER PUBLICATIONS

Office Action for U.S. Appl. No. 16/072,133 dated Jun. 19, 2019.

(Continued)

*Primary Examiner* — Silvana C Runyan
(74) *Attorney, Agent, or Firm* — Thomas Rooney; C. Tumey Law Group PLLC

(57) ABSTRACT

A variety of systems, methods and compositions are disclosed for cementing in subterranean formations. Embodiments may include the use of slag co-grind in well cementing operations.

19 Claims, 2 Drawing Sheets

(56) References Cited

U.S. PATENT DOCUMENTS

| | | | |
|---|---|---|---|
| 8,557,036 B1* | 10/2013 | Chatterji | C04B 40/0042 |
| | | | 106/470 |
| 2006/0054319 A1 | 3/2006 | Fyten et al. | |
| 2006/0166834 A1 | 7/2006 | Roddy | |
| 2009/0124522 A1 | 5/2009 | Roddy | |
| 2011/0028594 A1* | 2/2011 | Roddy | C04B 28/02 |
| | | | 523/130 |
| 2012/0160121 A1 | 6/2012 | Roddy | |
| 2012/0160131 A1 | 6/2012 | Roddy | |
| 2013/0048286 A1 | 2/2013 | Morgan et al. | |
| 2013/0153214 A1* | 6/2013 | Roddy | E21B 33/13 |
| | | | 166/250.01 |

OTHER PUBLICATIONS

Final Office Action for U.S. Appl. No. 16/072,133 dated Oct. 16, 2019.
Office Action for U.S. Appl. No. 16/072,133 dated Jan. 15, 2020.
Notice of Allowance for U.S. Appl. No. 16/072,133 dated Mar. 11, 2020.
Canadian Examiners Report for Application No. 3,011,218 dated Jul. 15, 2019.
International Search Report and Written Opinion for PCT/US2016/025344 dated Dec. 8, 2016.

* cited by examiner

CO-GRINDING SLAG WITH OTHER MATERIAL FOR HYDRAULIC BINDERS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

A particular challenge in well cementing is the development of satisfactory mechanical properties in a cement composition within a reasonable time period after placement in the subterranean formation. During the life of a well, the cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like. These properties may be modified by the inclusion of additives.

One type of settable composition that has been used heretofore comprises slag cement, which is typically a blend of Portland cement and slag. Because Portland cement develops compressive strength much more rapidly than slag, the amount of slag is typically limited to no more than 40% by weight of the slag cement. Drawbacks to slag cement include the relatively high cost of the Portland cement as compared to the slag, which is a waste material. Drawbacks to using higher concentrations of slag may include the inability for the settable composition to develop adequate compressive strength in a reasonable time and ensure the long-term structural integrity of the cement.

BRIEF DESCRIPTION OF THE DRAWINGS

These drawings illustrate certain aspects of some of the embodiments of the present disclosure, and should not be used to limit or define the method.

DETAILED DESCRIPTION

Figure 1:
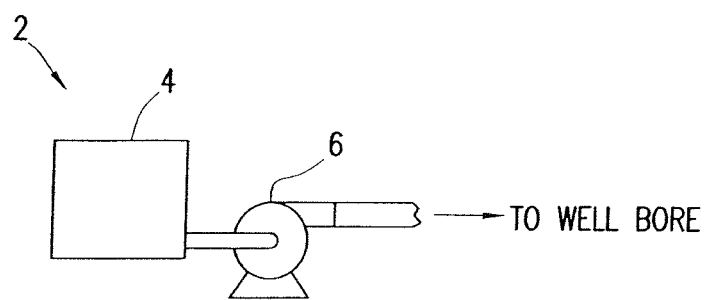
FIG. 1 is a schematic illustration of a system for preparation and delivery of a cement composition to a wellbore in accordance with certain examples.

The present disclosure relates to the co-grinding of slag and one or more additional cement components and, in specific examples, to methods, compositions, and systems that use a slag co-grind in well cementing. By way of example, the slag co-grind may without limitation be used in Portland cement, pozzolan-lime cement, slag-lime cement, super sulfated cements, calcium sulfoaluminate cement, or geopolymer cements to improve the cementitious properties of the cement versus conventional blending methods. There may be several potential advantages to the methods and compositions of the present disclosure, only some of which may be alluded to herein. One of the many potential advantages of the methods and compositions of the present disclosure is that the compressive strength of a cement comprising slag co-grind may be higher than that of traditionally blended cement. Another advantage may be increasing the compressive strength of cements comprising lower cost and lower strength additives.

Without limitation, the cement compositions may comprise cement, slag co-grind, and water. Those of ordinary skill in the art will appreciate that the cement compositions generally should have a density suitable for a particular application. By way of example, the cement composition may have a density in the range of from about 4 pounds per gallon ("lb/gal") to about 20 lb/gal and, in some compositions, a density in the range of from about 8 lb/gal to about 17 lb/gal. The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, should recognize the appropriate density for a particular application.

Any of a variety of cements suitable for use in subterranean cementing operations may be used in the disclosed cement compositions. Suitable examples may include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. Without limitation, the hydraulic cement may comprise a Portland cement. Portland cements that may be suited for use in embodiments of the present disclosure may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present disclosure may be classified as ASTM Type I, II, or III. Without limitation, the cement may be present in the cement compositions of the present disclosure in an amount in the range of from about 1% to 99% by weight of cementitious components ("% bwoc"). The term "cementitious components" refers to the components, or a combination thereof, of the cement compositions that hydraulically set, or otherwise harden, to develop compressive strength, including, for example, portland cement, pozzolan-lime cement, slag-lime cement, super sulfated cements, calcium sulfoaluminate cement, slag co-grind, or geopolymer cements, and the like. The cement may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or 99% bwoc. In specific examples, the cement may be present in the cement compositions in an amount in the range of from about 5% to 99% bwoc, from about 25% to 75% bwoc, or from about 40% to 60% bwoc. One of ordinary skill in the art, with the benefit of this disclosure, should be able to select an appropriate amount of cement for a particular application.

The cement compositions may further comprise a slag co-grind. Co-grinding as described in the present disclosure means introducing slag and at least one other cement component into a grinder and grinding them together. The terms "grind", "ground", or "grinding" as used herein mean using a grinder to reduce the mean particle size of the components. Herein, the slag and the cement component to be co-ground with the slag may be referred to individually as a co-ground cement component or collectively as co-ground cement components. Furthermore, the slag co-grind may be dry mixed or dry blended with a cement prior to use.

The slag co-grind may comprise slag. Slag is generally a by-product in the production of various metals from their corresponding ores, By way of example, the production of cast iron can produce slag as a granulated, blast furnace by-product with the slag generally comprising the oxidized impurities found in iron ore. Slag generally does not contain sufficient basic material, so slag may be used with a base to produce a settable composition that may react with water to set to form a hardened mass. The base may be produced in the setting of another cement component, such as Portland cement, or more may be separately added. Examples of suitable sources of bases include, but are not limited to, sodium hydroxide, sodium bicarbonate, sodium carbonate, lime, and combinations thereof. Where present, the slag generally may be included in the slag co-grind in an amount sufficient to provide the desired compressive strength, density, and/or cost. Without limitation, the slag may be present in the slag co-grind of the present disclosure in an amount in the range of about 0.1% to about 75% by weight of the slag co-grind, for example, about 5%, about 10%, about 20%, about 30%, about 40%, about 50%, about 60%, or about 70%. One of ordinary skill in the art, with the benefit of this disclosure, should recognize the appropriate amount of the slag to include for a chosen application.

Cement components may be ground with the slag to produce a slag co-grind. The cement components may comprise many compounds and components including, but not limited to, metakaolin, shale, perlite, fly ash, zeolite, pumice, wollastonite, and calcium aluminate cements. One of ordinary skill in the art, with the benefit of this disclosure, should be able to select an appropriate cement component for co-grinding with the slag. Generally, metakaolin is a white pozzolan that may be prepared by heating kaolin clay, for example, to temperatures in the range of about 600° C. to about 800° C. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are available from TXI Energy Services, Inc., Houston, Tex. Perlite is an ore and generally refers to a naturally occurring volcanic, amorphous siliceous rock comprising mostly silicon dioxide and aluminum oxide. Perlite suitable for use in the slag co-grind may include expanded perlite and unexpanded perlite. Wollastonite is a naturally occurring calcium inosilicate mineral that may contain amounts of iron, magnesium, and manganese. Calcium aluminate cements are generally cements that comprise large proportion of hydraulic calcium aluminates Fly ash is the finely divided residue that results from the combustion of ground or powdered coal and it is carried by the flue gases generated. Fly ash may comprise a mixture of alumina, silica, unburned carbon and various metallic oxides. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions may be required for the Class F fly ash to form a settable composition with water.

Zeolites suitable for use typically may include porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. An example of a suitable source of zeolite is available from the C2C Zeolite Corporation of Calgary, Canada.

Cement components before slag co-grinding may have a mesh size (U.S. Sieve Series) from about 10 mesh to about 50 mesh, from about 50 mesh to about 100 mesh, from about 100 mesh to about 300 mesh, from about 300 to about 500 mesh, or greater. Additionally, cement components may have any distribution of particle size within the aforementioned mesh sizes. Cement components to be co-ground may, without limitation, comprise any starting shape such as flakes, shavings, amorphous glob, spherical, cubic, or cylindrical. Cement components may comprise any initial density or porosity. Without limitation, the cement components may be present in the slag co-grind in an amount in the range of about 0.1% to about 75% by weight of the slag co-grind, for example, about 5%, about 10%, about 20%, about 30%, about 40%, about 50%, about 60%, or about 70%. One of ordinary skill in the art, with the benefit of this disclosure, should recognize the appropriate amount of the cement components to include for a chosen application.

The co-ground cement components including slag and one or more additional cement components may be combined in any suitable grinder which may include, but is not limited to, a ball mill, rod mill, autogenous mill, semi-autogenous mill, pebble mill, high pressure grinding roll, buhrstone mill, vertical shaft impactor mill, or tower mill. The co-ground cement components may be co-ground for any length of time. Without limitation, the co-ground cement components may be co-ground from about 2 to about 24 hours, from about 5 to about 10 hours, from about 10 to about 15 hours, from about 15 to about 24 hours, or more. Without limitation, the co-ground cement components may be co-ground until a selected particle size distribution of the co-ground cement components is achieved. Co-ground cement components may be separated by particle size after co-grinding. Separating the co-ground cement components may include sieving or any other suitable technique for separating the co-ground cement components to provide a desired particle size. Final particle size of co-ground cement components may be any size smaller than pre-ground size. Without limitation, the final particle size of the slag co-grind may be about 1 nanometer to about 1 micron, for example, about 10 nanometers, about 50 nanometers, about 100 nanometers, about 200 nanometers, or more. It should be understood that these disclosed ranges are merely exemplary and that a smaller or larger particle size may be desired for a particular application.

Without limitation, a ball mill may be used to co-grind cement components. The ball mill may be without limitation a horizontal ball mill, vertical ball mill, or planetary ball mill. Those of ordinary skill in the art, with the benefit of this disclosure, will recognize the appropriate mill for a particular application. In general, the ball mill may be charged with the co-ground cement components and a charge of selected balls. The ball mill may then be rotated until the particle size distribution of co-ground components is satisfactory. The co-ground cement components may be individually weighed before being charged to the ball mill or may be weighed together. The ball mill may comprise any ball charge. A ball charge may comprise a single ball size or multiple ball sizes. A ball charge may comprise plurality of ball size distributions. Without limitation, the ball charge may be about 800 12.5 mm balls and about 200 19.68 mm balls, about 500 12.5 mm balls and about 500 19.68 mm balls, about 1000 12.5 mm balls, or more. It should be understood that the number of balls needed is dependent on the volume of material that is desired to be co-ground. It should be further realized that the final particle size may be affected by the size and size distribution of the balls chosen. Balls may be constructed from any materials and may, without limitation, comprise metals, alloys, or ceramics. Multiple ball material types may be used in in a single ball charge. With the benefit of this disclosure, one of ordinary skill in the art may select an appropriate ball charge and ball mill.

The slag co-grind may be included in the cement compositions in an amount sufficient to provide, for example, the desired compressive strength, gelation time, and the like. Without limitation, the slag co-grind may be present in the cement compositions of the present disclosure in an amount in the range of from about 1% to 99% bwoc. The slag co-grind may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or 99% bwoc. In specific examples, the slag co-grind may be present in the cement compositions in an amount in the range of from about 5% to 99% bwoc, from about 25% to 75% bwoc, or from about 40% to 60% bwoc. One of ordinary skill in the art, with the benefit of this disclosure, will recognize the appropriate amount of the co-ground cement components to include for a chosen application.

The water used in the cement compositions of the present disclosure may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. Without limitation, the water may be present in the cement composition in an amount in the range of about 33% to about 200% bwoc. In certain embodiments, the water may be present in the cement composition in the range of about 35% to about 70% bwoc. One of ordinary skill in the art with the benefit of this disclosure should recognize the appropriate amount of water for a chosen application.

Other additives suitable for use in subterranean cementing operations also may be added to the cement compositions as desired for a particular application. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, lime, elastomers, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, the slag co-grind may be used in a variety of subterranean applications, including primary and remedial cementing. Without limitation, the cement compositions comprising the slag co-grind may be introduced into a subterranean formation and allowed to set. As used herein, introducing the cement composition into a subterranean formation includes introduction into any portion of the subterranean formation, into near wellbore region surrounding the wellbore, or into both. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a microannulus).

A method of cementing may comprise providing a cement composition comprising water, a cement, and a slag co-grind wherein the slag co-grind comprises slag and a cement component, introducing the cement composition into a subterranean formation, and allowing the cement composition to set in the subterranean formation. This method may include any of the various features of the compositions, methods, and systems disclosed herein, including one or more of the following features in any combination. The slag co-grind may have a particle size of about 1 nanometer to about 1 micron. The slag co-grind may be present in an amount of about 1% to about 99% by weight of the cementitious components. The cement component may be selected from the group consisting of metakaolin, shale, perlite, pozzolan, zeolite, calcium aluminate cement, wollastonite, and combinations thereof. The cement composition may be introduced into a wellbore annulus in a primary cementing operation. The cement composition may comprise at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. The slag co-grind may be ground in a ball mill. The ball mill may comprise a ball charge comprising balls of different sizes. The slag co-grind may also be ground in a grinder selected from the group consisting of rod mill, autogenous mill, semi-autogenous mill, pebble mill, high pressure grinding roll, buhrstone mill, vertical shaft impactor mill, and tower mill. The slag co-grind may be size-separated by sieving after grinding. The slag co-grind may comprise a basic material. The slag co-grind and cement may be dry blended.

A cement composition may comprise water, a cement, and a slag co-grind comprising slag and a cement component. This cement composition may include any of the various features of the compositions, methods, and systems disclosed herein, including one or more of the following features in any combination. The slag co-grind may have a particle size of about 1 nanometer to about 1 micron. The slag co-grind may be present in an amount of about 1% to about 99% by weight of the cementitious components. The cement component may be selected from the group consisting of metakaolin, shale, perlite, pozzolan, zeolite, calcium aluminate cement, wollastonite, and combinations thereof. The cement composition may be introduced into a wellbore annulus in a primary cementing operation. The cement composition may comprise at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. The slag co-grind may be ground in a ball mill. The ball mill may comprise a ball charge comprising balls of different sizes. The slag co-grind may also be ground in a grinder selected from the group consisting of rod mill, autogenous mill, semi-autogenous mill, pebble mill, high pressure grinding roll, buhrstone mill, vertical shaft impactor mill, and tower mill. The slag co-grind may be size-separated by sieving after grinding. The slag co-grind may comprise a basic material. The slag co-grind and cement may be dry blended.

A system for cementing in a subterranean formation may comprise a cement composition comprising a cement, water, and a slag co-grind, wherein the slag co-grind comprise slag and a cement component, mixing equipment capable of mixing the cement composition, pumping equipment capable of delivering the cement composition into a wellbore. This system may include any of the various features of the compositions, methods, and systems disclosed herein, including one or more of the following features in any combination. The slag co-grind may have a particle size of about 1 nanometer to about 1 micron. The slag co-grind may be present in an amount of about 1% to about 99% by weight of the cementitious components. The cement component may be selected from the group consisting of metakaolin, shale, perlite, pozzolan, zeolite, calcium aluminate cement, wollastonite, and combinations thereof. The cement composition may be introduced into a wellbore annulus in a primary cementing operation. The cement composition may comprise at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. The slag co-grind may be ground in a ball mill. The ball mill may comprise a ball charge comprising balls of different sizes. The slag co-grind may also be ground in a grinder selected from the group consisting of rod mill, autogenous mill, semi-autogenous mill, pebble mill, high pressure grinding roll, buhrstone mill, vertical shaft impactor mill, and tower mill. The slag co-grind may be size-separated by sieving after grinding. The slag co-grind may comprise a basic material. The slag co-grind and cement may be dry blended.

Referring now to FIG. 1, preparation of a cement composition comprising a slag co-grind in accordance with example systems, methods and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art.

Figure 2A:
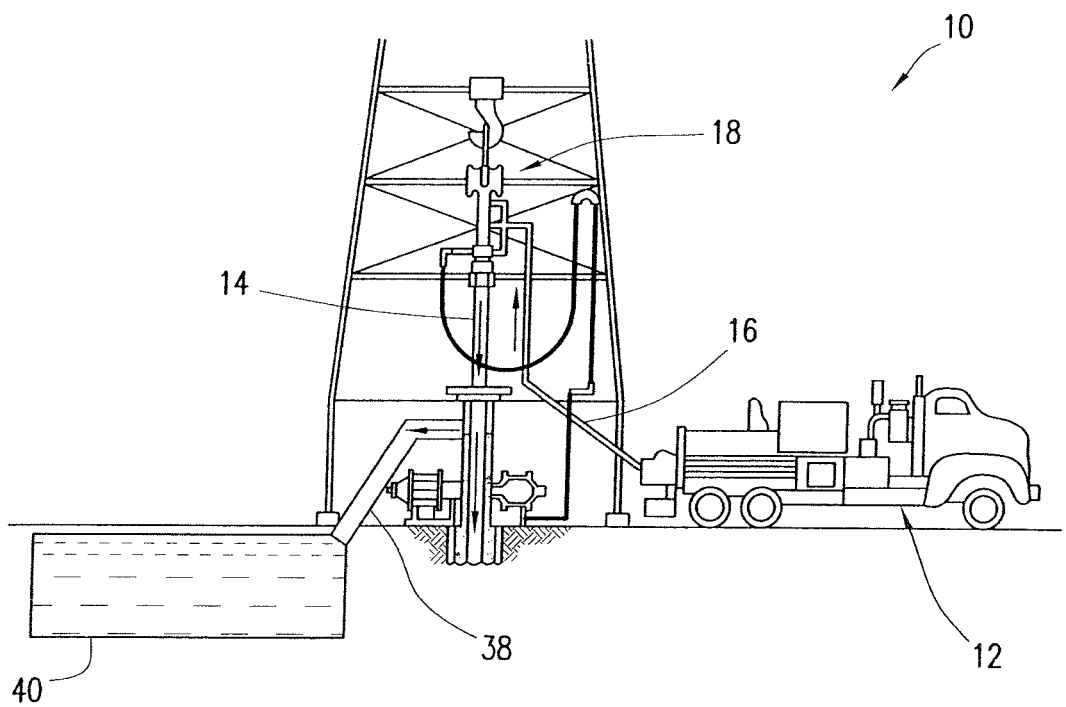
FIG. 2A is a schematic illustration of surface equipment that may be used in placement of a cement composition in a wellbore in accordance with certain examples.

An example technique for placing a cement composition comprising a slag co-grind, as described herein, into a subterranean formation will now be described with reference to FIGS. 2A and 2B. FIG. 2A illustrates surface equipment 10 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

Figure 2B:
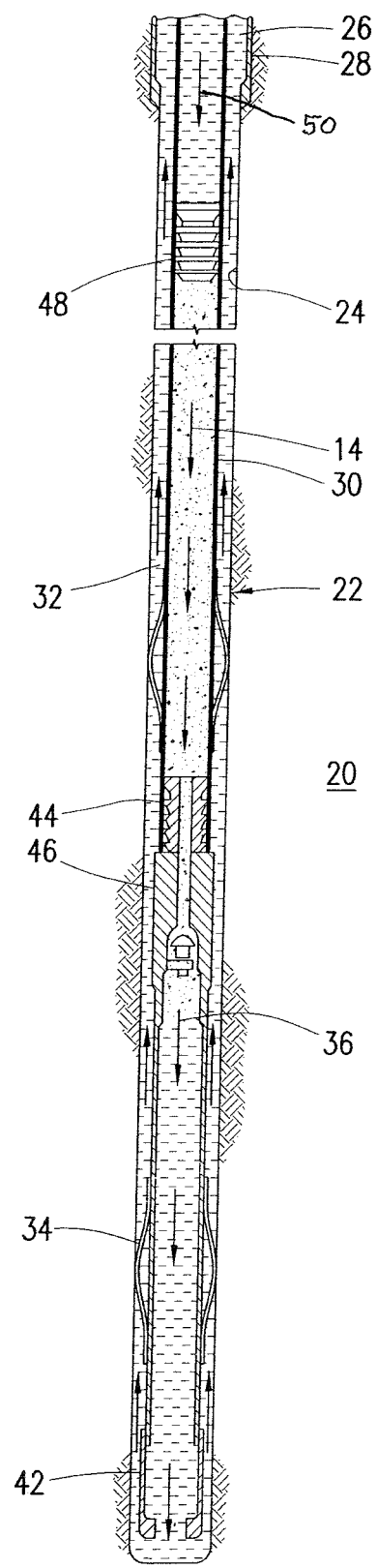
FIG. 2B is a schematic illustration of placement of a cement composition into a wellbore annulus in accordance with certain examples.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

Accordingly, the present disclosure may provide methods relating to preparation of cements. The methods may include any of the various features disclosed herein, including one or more of the following statements.

Statement 1. A cement composition comprising; water; a cement; and a slag co-grind comprising slag and a cement component.

Statement 2. The composition of statement 1, wherein the cement component is selected from the group consisting of metakaolin, shale, perlite, pozzolan, zeolite, aluminum silicate, wollastonite, and combinations thereof.

Statement 3. The composition of statement 1, wherein the slag co-grind has a particle size of about 1 nanometer to about 1 micron.

Statement 4. The composition of statement 1, wherein the slag co-grind is present in an amount of about 1% to about 99% by weight of cementitious components.

Statement 5. A method comprising: providing a slag co-grind comprising slag and at least one cement component selected from the group consisting of metakaolin, shale, perlite, pozzolan, zeolite, calcium aluminate cement, and combinations thereof, wherein the slag is a by-product from processing of a metal ore; dry blending the slag co-grind and a cement to form a cement dry blend; and preparing a cement composition comprising water and the cement dry blend.

Statement 6. The method of statement 5, wherein the slag co-grind has a final particle size of about 1 nanometer to about 1 micron.

Statement 7. The method of statement 5, wherein the slag co-grind is present in an amount of about 1% to about 99% by weight of cementitious components.

Statement 8. The method of statement 5, wherein the step of introducing the cement composition into a subterranean formation comprises introducing the cement composition into a wellbore annulus in a primary cementing operation.

Statement 9. The method of statement 5, wherein the cement composition further comprises at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof.

Statement 10. The method of statement 5, further comprising grinding the slag co-grind in a ball mill.

Statement 11. The method of statement 10, wherein the ball mill comprises a ball charge comprising balls of different sizes.

Statement 12. The method of statement 5, further comprising grinding the slag co-grind in a grinder selected from the group consisting of rod mill, autogenous mill, semi-autogenous mill, pebble mill, high pressure grinding roll, buhrstone mill, vertical shaft impactor mill, and tower mill.

Statement 13. The method of statement 5, wherein the slag co-grind is further separated by sieving after grinding.

Statement 14. The method of statement 5, wherein the slag co-grind further comprises a basic material.

Statement 15. A method comprising: first, co-grinding a composition comprising slag and at least one cement component selected from the group consisting of metakaolin, shale, perlite, pozzolan, zeolite, calcium aluminate cement, and combinations thereof, to form a slag co-grind, wherein the slag is a by-product from processing of a metal ore; and second, dry blending the slag co-grind and a cement to form a cement dry blend.

Statement 16. The method of statement 15, wherein the cement dry blend further comprises at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof.

Statement 17. The method of statement 15, wherein the slag co-grind is present in an amount of about 1% to about 99% by weight of the cement.

Statement 18. The method of statement 15, wherein the slag co-grind has a particle size of about 1 nanometer to about 1 micron.

Statement 19. The method of statement 15 further comprising preparing a cement composition comprising water and the cement dry blend.

Statement 20. The method of statement 19 further comprising placing the cement composition in a wellbore.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems, methods and cement compositions are given. In no way should the following examples be read to limit, or define, the entire scope of the disclosure.

Example 1

This example demonstrates the difference in cement strength between co-grinding components versus mixing components together in unground form. In co-grinding tests, components 1 and 2 were co-ground in a Tinius Olsen ball mill (TO-441-02). The ball charge used comprised 800 12.5 mm balls and 200 19.68 mm balls to complete the 1000 ball charge. Equal weight of each material were measured and added to the ball mill together. A total of 1000 grams of solids were ground in each batch: 1000 grams of component 1 and 1000 grams of component 2, as described in Table 1. The ball charge was then set in motion for 1000 revolutions to co-grind the materials together. The resultant co-grind was then dry blended with Portland Tex. Lehigh class H cement. In mixing tests, component 1 and 2 were dry mixed with cement without grinding. In each test, class H cement was mixed with a blend of 25% component 1 and 25% of component 2 by weight of cement. A slurry was mixed at 15.6 lb/gal and strength development was tested at 140° F. after 24 hours. Data for tests is presented in Table 1.

TABLE 1

| Slurry | % Class H bwoc | Component 1 (25% bwoc) | Component 2 (25% bwoc) | Blending Method | S.G. | Sack Weight (lbs/sk) | 24 Hour Compressive Strength (psi) |
|---|---|---|---|---|---|---|---|
| 1 g* | 50 | Slag | Metakaolin | Grinding | 2.55 | 84.5 | 3570 |
| 1 m* | 50 | Slag | Metakaolin | Mixing | 2.55 | 84.5 | 3140 |
| 2 g | 50 | Slag | Shale | Grinding | 2.62 | 85.6 | 4330 |
| 2 m | 50 | Slag | Shale | Mixing | 2.62 | 85.6 | 4240 |
| 3 g | 50 | Slag | Perlite** | Grinding | 2.52 | 84.1 | 3990 |
| 3 m | 50 | Slag | Perlite** | Mixing | 2.52 | 84.1 | 3900 |
| 4 g | 50 | Slag | Fly Ash | Grinding | 2.63 | 86 | 4210 |
| 4 m | 50 | Slag | Fly Ash | Mixing | 2.63 | 86 | 3320 |
| 5 g | 50 | Slag | Zeolite | Grinding | 2.57 | 84 | 4320 |
| 5 m | 50 | Slag | Zeolite | Mixing | 2.57 | 84 | 5870 |
| 6 g | 50 | Slag | CAC | Grinding | 2.84 | 88 | 2790 |
| 6 m | 50 | Slag | CAC | Mixing | 2.84 | 88 | 2600 |
| 7 g | 50 | Slag | Wollastonite | Grinding | 2.84 | 88 | 1676 |
| 7 m | 50 | Slag | Wollastonite | Mixing | 2.84 | 88 | 1541 |

*6 g of Halliburton CFR-3 ™ (cement friction reducer) was added to the total blend.
**The perlite used was Perlite IM 325, a designation of a particular grade of HESS ® branded perlite.
***The calcium aluminate cement (CAC) used was Secar ® 71 calcium aluminate cement.

Example 2

In this example, component 1 and 2 were individually ground in a ball mill and then dry blended with Portland Tex. Lehigh H cement. This example demonstrates the decrease in compressive strength of the cement composition comprising individually ground components versus the previously presented cement composition comprising co-grinding components. A slurry was mixed at 15.6 lb/gal and strength development was tested at 140° F. after 24 hours. The results are presented in Table 2.

TABLE 2

| Slurry | % Class H bwoc | Component 1 (25% bwoc) | Component 2 (25% bwoc) | Blending Method | S.G. | Sack Weight (lbs/sk) | 24 Hour Compressive Strength (psi) |
|---|---|---|---|---|---|---|---|
| A | 50 | Slag | Metakaolin | Individual Grinding/ Mixing | 2.55 | 84.5 | 3080 |

TABLE 2-continued

| Slurry | % Class H bwoc | Component 1 (25% bwoc) | Component 2 (25% bwoc) | Blending Method | S.G. | Sack Weight (lbs/sk) | 24 Hour Compressive Strength (psi) |
|---|---|---|---|---|---|---|---|
| B | 50 | Slag | Shale | Individual Grinding/ Mixing | 2.62 | 85.6 | 3670 |
| C | 50 | Slag | Perlite* | Individual Grinding/ Mixing | 5.52 | 84.1 | 3390 |
| D | 50 | Slag | Fly Ash | Individual Grinding/ Mixing | 2.63 | 86 | 2410 |
| E | 50 | Slag | Wollastonite | Individual Grinding/ Mixing | 2.84 | 88 | 1842 |

*The perlite used was Perlite IM 325, a designation of a particular grade of HESS ® branded perlite.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A cement composition comprising;
   water;
   a cement; and
   a slag co-grind consisting of slag and a cement component selected from the group consisting of perlite, calcium aluminate cement, and combinations thereof, wherein the slag is a by-product from processing of a metal ore.

2. The composition of claim 1, wherein the slag co-grind has a particle size of about 1 nanometer to about 1 micron.

3. The composition of claim 1, wherein the slag co-grind is present in an amount of about 1% to about 99% by weight of cementitious components.

4. A method comprising:
   providing a slag co-grind comprising slag and at least one cement component selected from the group consisting of metakaolin, shale, perlite, pozzolan, zeolite, calcium aluminate cement, and combinations thereof, wherein the slag is a by-product from processing of a metal ore;
   dry blending the slag co-grind and a cement to form a cement dry blend; and
   preparing a cement composition comprising water and the cement dry blend.

5. The method of claim 4, wherein the slag co-grind has a final particle size of about 1 nanometer to about 1 micron.

6. The method of claim 4, wherein the slag co-grind is present in an amount of about 1% to about 99% by weight of cementitious components.

7. The method of claim 4, wherein the step of introducing the cement composition into a subterranean formation comprises introducing the cement composition into a wellbore annulus in a primary cementing operation.

8. The method of claim 4, wherein the cement composition further comprises at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof.

9. The method of claim 4, further comprising grinding the slag co-grind in a ball mill.

10. The method of claim 9, wherein the ball mill comprises a ball charge comprising balls of different sizes.

11. The method of claim 4, further comprising grinding the slag co-grind in a grinder selected from the group consisting of rod mill, autogenous mill, semi-autogenous mill, pebble mill, high pressure grinding roll, buhrstone mill, vertical shaft impactor mill, and tower mill.

12. The method of claim 4, wherein the slag co-grind is further separated by sieving after grinding.

13. The method of claim 4, wherein the slag co-grind further comprises a basic material.

14. A method comprising:
   first, co-grinding a composition comprising slag and at least one cement component selected from the group consisting of metakaolin, shale, perlite, pozzolan, zeolite, calcium aluminate cement, and combinations thereof, to form a slag co-grind, wherein the slag is a by-product from processing of a metal ore; and
   second, dry blending the slag co-grind and a cement to form a cement dry blend.

15. The method of claim 14, wherein the cement dry blend further comprises at least one component selected from the group consisting of strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof.

16. The method of claim 14, wherein the slag co-grind is present in an amount of about 1% to about 99% by weight of the cement.

17. The method of claim 14, wherein the slag co-grind has a particle size of about 1 nanometer to about 1 micron.

18. The method of claim 14 further comprising preparing a cement composition comprising water and the cement dry blend.

19. The method of claim 18 further comprising placing the cement composition in a wellbore.

* * * * *